United States Patent [19]

Helmschrott

[11] 3,825,810

[45] July 23, 1974

[54] SERVOMECHANISM, PARTICULARLY A VEHICLE SPEEDOMETER OR TRIP-RECORDER

[75] Inventor: Norbert Helmschrott, Schwenningen, Germany

[73] Assignee: Kienzle Apparate GmbH, Villingen/Schwarzwald, Germany

[22] Filed: June 23, 1972

[21] Appl. No.: 265,797

[30] Foreign Application Priority Data
June 26, 1971  Germany............................ 2131915

[52] U.S. Cl............................... 318/618, 318/611
[51] Int. Cl.............................................. G05b 5/01
[58] Field of Search......................... 318/611, 618

[56] References Cited
UNITED STATES PATENTS

| | | | |
|---|---|---|---|
| 2,126,691 | 8/1938 | Schmitter | 74/410 |
| 2,386,367 | 10/1945 | Taylor | 74/410 |
| 2,734,396 | 2/1956 | Falk | 74/410 X |
| 2,911,845 | 11/1959 | North | 74/410 |
| 3,093,784 | 6/1963 | Mintzer | 318/618 X |
| 3,167,975 | 2/1965 | Durand | 74/410 X |
| 3,245,279 | 4/1966 | Baker | 74/410 |
| 3,283,231 | 11/1966 | Askew | 318/618 |
| 3,400,212 | 9/1968 | Plummer | 318/618 X |
| 3,559,018 | 1/1971 | Fournier | 318/618 X |
| 3,660,744 | 5/1972 | Plummer | 318/618 X |

Primary Examiner—T. E. Lynch
Attorney, Agent, or Firm—Michael S. Striker

[57] ABSTRACT

A servomechanism, particularly a vehicle speedometer or trip-recorder includes a controlled member, such as a speedometer needle or a trip-recorder scribe, as well as a servomotor and a drive gear driven by the servomotor. A servoamplifier has an output connected to the servomotor and a differential input. A command unit connected to the amplifier input furnishes thereto signals indicative of a commanded position for the controlled member. A feedback transducer furnishes to the amplifier input signals indicative of the position of the controlled member, and has a transducer input gear driven by the drive gear and defining therewith a first meshing region having a predetermined orientation relative to the axis of the transducer input gear. A driven gear driven by the transducer input gear and driving the controlled member, defines with the transducer input gear a second meshing region having a predetermined orientation relative to the axis of said transducer gear which is angularly offset from the orientation of the first meshing region by an angle of substantially less than 180°, and most advantageously, 0°.

10 Claims, 3 Drawing Figures

SERVOMECHANISM, PARTICULARLY A VEHICLE SPEEDOMETER OR TRIP-RECORDER

BACKGROUND OF THE INVENTION

The invention relates to servomechanisms, particularly vehicle speedometers and trip-recorders.

More particularly, the invention relates to vehicle speedometers and trip-recorders incorporating feedback compensation, i.e., wherein the command signal indicative of engine speed is applied to the differential input of a servoamplifier to which is also applied a feedback signal from a position-responsive feedback transducer, and particularly an angular-position-responsive feedback transducer. Such feedback transducer can for instance be a rotary potentiometer or a rotary capacitor transducer.

Still more particularly, the invention relates to vehicle speedometers and the like, wherein the transducer input gear is located in the servomechanism gear train intermediate the drive gear and the driven gear associated with the speedometer needle, trip-recorder scribe, or the like.

The problems associated with the design of vehicle speedometers and trip recorders are different from those prevailing in the design of most other measuring instruments and indicators. Specifically, very precise correspondence between vehicle speed and speedometer-needle deflection is not feasibly attained except by the use of feedback compensation networks, that is, a servomechanism whose controlled member is the speedometer needle and whose input signal is a speed-proportional voltage derived from a suitable A.C. generator, for instance. The principles of servomechanisms are of course extremely well known.

It is common practice in such arrangements to drive the transducer gear off of one of the gears in the gear train between the servomotor and the controlled member. It is also known to incorporate the transducer gear into the main gear train itself, that is, so that it serves as an intermediate gear driven by the motor and driving the controlled member.

A predictable difficulty resulting from the use of such gear trains in speedometer servomechanisms and the like is the phenomenon of backlash. That is, the play between meshing gear teeth results in a certain "dead time" when the direction of drive is reversed. This results in a substantial increase in the percentage-error of the reading actually provided by the speedometer or trip-recorder. It is the backlash factor in particular which motivates the use of the feedback-transducer (potentiometer) gear as an intermediate gear driven by the motor and driving the controlled member. In addition, a permanent unidirectional biasing force is commonly applied to one of the final gears, particularly to the gear directly associated with the controlled member. This unidirectional biasing force will prevent backlash, at least in the final gears of the train.

While backlash is thus substantially reduced, the biasing force creates new problems. Specifically, when the gear train is driven in one of its two directions, the driving torque applied to the transducer gear will oppose, rather than augment, the backlash-preventing biasing torque applied to the transducer gear; and in such a manner that the resultant force is predominantly radial. Such radial force produces very significant stresses on the bearings for the transducer gear. This bearing stress is particularly serious when, in the interest of reducing backlash to zero, a strong biasing force is utilized.

Clearly, it is possible to deal with these bearing stresses by providing excellent bearings which are highly wear-resistant and which also permit very free turning despite such radial bearing stress. Ball bearings, for instance, meet such requirements. However, ball bearings, and other high-quality bearings, are fairly expensive, and their proper installation increases the assembly cost, and increases the skill required of the worker who assembles the gear train.

SUMMARY OF THE INVENTION

It is accordingly a general object of the invention to overcome such disadvantages of known vehicle speedometer and trip-recorder servomechanisms.

It is a more particular object to provide a speedometer servomechanism whose mechanical parts are arranged in a manner which overcomes such disadvantages.

It is a still more specific object to provide a speedometer servomechanism whose mechanical parts are arranged in such a manner as to greatly reduce the radial force exerted on the bearings for the input gear of the position-responsive transducer.

These objects, and others which will become more apparent hereafter, can be met by a speedometer or trip-recorder servomechanism which includes a controlled member—namely the speedometer needle or trip-recorder scribe, as well as a servomotor and a drive gear driven by the servomotor. A servoamplifier has an output connected to the servomotor and has a differential input. A command unit connected to the differential amplifier input furnishes thereto signals indicative of a commanded position for the speedometer needle. A feedback transducer furnishes to the amplifier input signals indicative of the actual position of the speedometer needle, or trip-recorder scribe. The feedback transducer has a transducer input gear driven by the drive gear and defining therewith a first meshing region having a certain orientation relative to the axis of the transducer input gear. A driven gear is driven by the transducer input gear and serves to drive the controlled member. The driven gear defines with the transducer input gear a second meshing region having a certain orientation relative to the axis of said transducer input gear which is angularly offset from the orientation of the first meshing region by an angle of substantially less than 180°. Advantageously, the angular offset between the first and second meshing regions is very small, and when the angular offset is 0°, the radial bearing stress can be all but completely eliminated.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
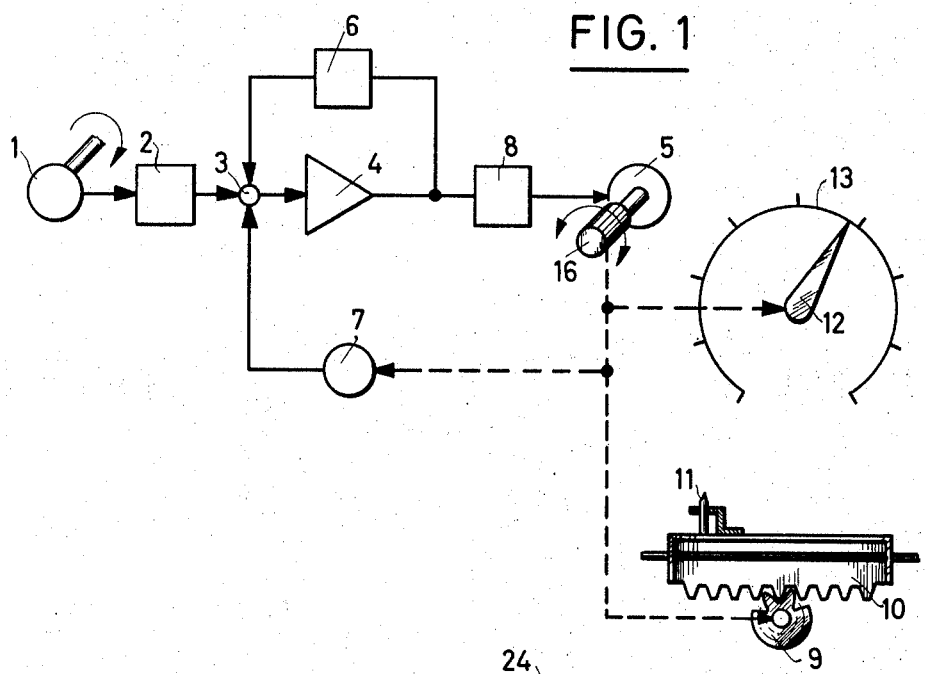
FIG. 1 is a block diagram of a speedometer/trip-recorder servomechanism.
Figure 3:
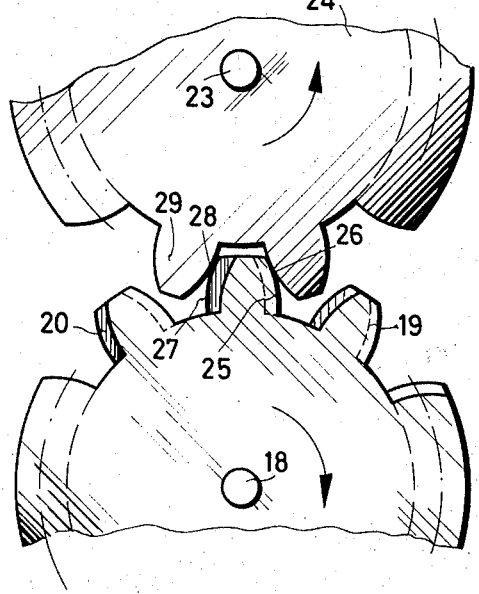
FIG. 3 illustrates the meshing between two particular gears of the servomechanism of FIG. 1.

The block diagram of FIG. 1 provides an overall picture of the speedometer servomechanism according to the invention. The servomechanism concepts as such are of course not novel.

The arrangement can include either or both of two controlled members, namely a speedometer needle 12 and a trip-recorder scribe 11. Speedometer needle 12 is angularly displaceable over a calibrated scale 13, and scribe 11 is mounted for slidinng movement on carriage 10 and is driven by an associated gear 9.

The controlled members 11, 12 are driven by a servomotor 5 having an output gear 16. The dotted lines in FIG. 1, in conventional manner, symbolize mechanical linkage.

The activating signal for servomotor 5 is applied from the output of servoamplifier 4 via amplifier end stage 8. Amplifier 4, in conventional manner, has a differential input 3. Also in conventional manner, the amplifier has a feedback network 6 connected from the amplifier output to the amplifier input. Furthermore, the servomechanism includes a command unit, comprising a tachometer generator 1 which produces pulses at a frequency corresponding to engine or wheel speed, and a frequency-to-voltage converter 2, which applies to the input of servoamplifier 4 voltage corresponding to engine or wheel speed. Finally, feedback transducer means 7 is mechanically connected with the controlled members 11, 12 and electrically connected with the input of servoamplifier 4. In known manner, feedback transducer 7 applies to the amplifier input a voltage indicative of the actual position of needle 12 and/or scribe 11. The feedback transducer 7 can be a rotary potentiometer, a rotary variable capacitor, or any other suitable type of transducer. The operation of the illustrated speedometer servomechanism is conventional.

Figure 2:
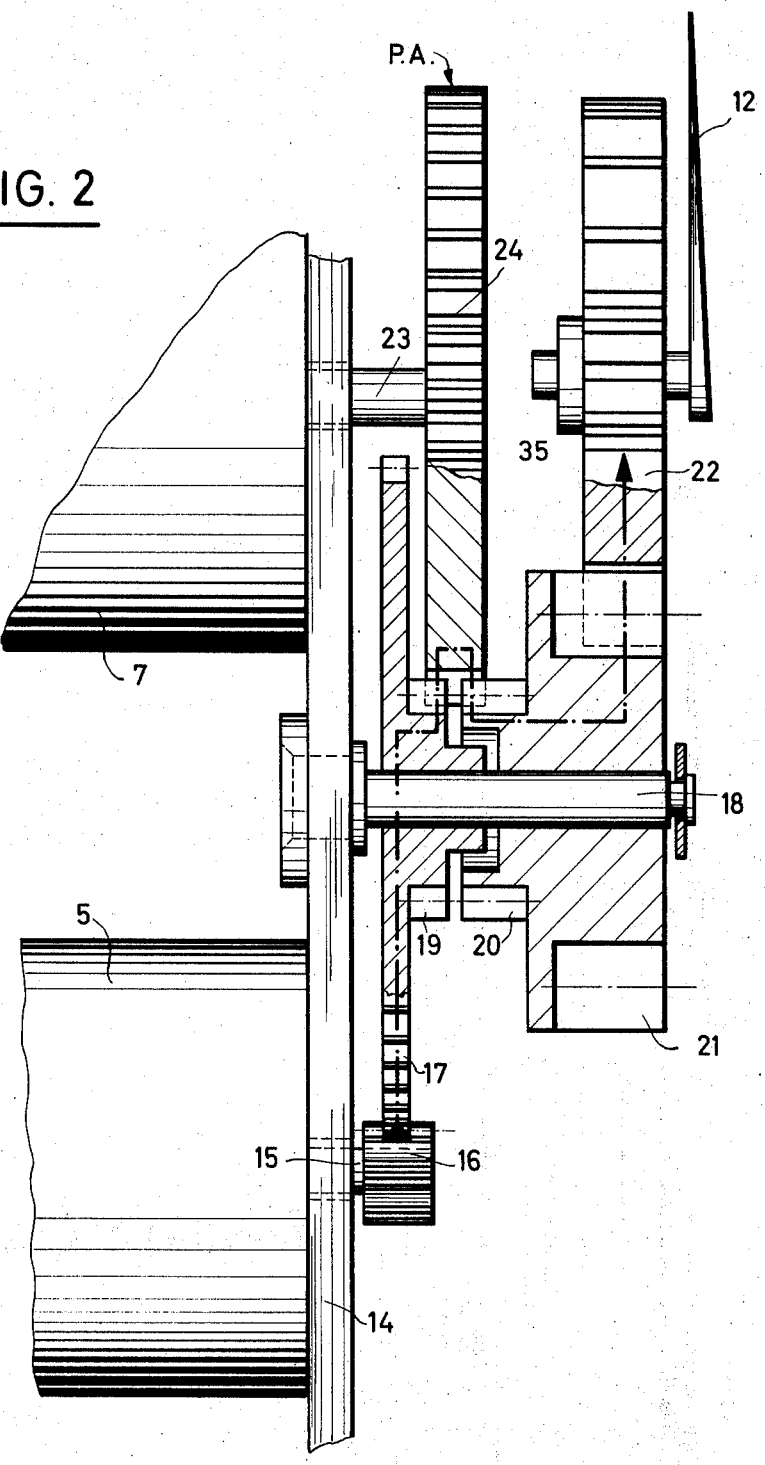
FIG. 2 illustrates the arrangement of gears in the servomechanism of FIG. 1.

The gear train of the illustrated speedometer servomechanism is shown in FIG. 2.

Servomotor 5 has an output shaft 15 which is rotatably mounted by a supporting wall 14. Provided on the end of output shaft 15 is an output gear 16. Rotary transducer 7 has an input shaft 23 likewise rotatably mounted by supporting wall 14. Input shaft 23 carries a transducer input gear 23.

A first intermediate gear 17 is rotatably mounted on axle 18, which in turn is supported by support wall 14. A drive gear 19 is likewise supported on axle 18 and rigidly, i.e.. non-rotatably, connected with first intermediate gear 17. Drive gear 19 receives torque from servomotor 5 and drives transducer input gear 23.

Transducer gear 23, in turn, drives a driven gear 20, which is also mounted on axle 18, but which is rotatable independently of the rotation of drive gear 19.

A second intermediate gear 21 is mounted for rotation on axle 18 and is rigidly connected with driven gear 20.

Second intermediate gear 21, finally, drives indicator gear 22. In the drawing, and for simplicity, the speedometer needle 12 is shown as mounted directly on indicator gear 22. However, a different number of intermediate gears may intervene between driven gear 20 and the gear carrying or driving the indicator member. Likewise, by an appropriate choice of gearing ratios, the speedometer needle 12 might be directly associated with the driven gear 20 itself. Likewise, the trip-recorder gear 9 might be the driven gear 20 itself. Many such modifications are possible. It should also be remembered that the gears employed may be of any type, for instance bevel gears, skew bevel gears, etc.

In the illustrated embodiment, the indicator gear 12 is biased by (schematically illustrated) biasing means 35 and permanently urged to turn in one of its two directions. Such biasing is provided in particular to eliminate backlash. As will be appreciated, the biasing force exerted by means 35 on gear 22 is communicated successively to gears 21, 20, 23 and 24, in that order, and also to some extent via gear 24 to gears 19, 17 and 16. If, to reduce the backlash effect to an absolute minimum, the force transmitted through the gears from biasing means 35 may be quite substantial. Certainly, the biasing torque which is applied to gear 24 by gear 20 will be of a significant magnitude.

The great advantage of the invention lies in the great reduction, and even elimination of bearing stresses on transducer shaft 23. The following explanation is offered of how such improvement is effected:

As mentioned, gear 20 always exerts a biasing torque on transducer gear 24. This force is always in a particular direction (e.g., into the plane of the drawing sheet) regardless of the direction in which the gears turn. This is because of the unidirectional biasing action of biasing means 35.

Drive gear 19 also exerts a torque on transducer gear 24. However, the direction of this torque changes when the direction of gear rotation changes. In one direction of motor rotation, gears 19, 20 will apply torque to gear 24 in the same direction, so that the torques add. In the opposite direction of motor rotation, gears 19, 20 will apply to gear 24 oppositely acting torques, and the torques will subtract. Most importantly, when the torques oppose, no net radial bearing stress results. This is because the region of meshing between gears 19, 24 is angularly displaced from the meshing region between gears 20, 24 only by a small angle, preferably zero, and no net radial force results.

In the prior art, however, the angular displacement between the two meshing regions was always very great, most often 180°. In FIG. 2, reference characters PA indicate where in the prior art the force from drive gear 19 was conventionally applied. As will be appreciated, in one of the two directions of gear rotation, the prior-art torque applied to gear 24 at region PA would oppose the back-bias torque applied (as in FIG. 2) by gear 20. Accordingly, in the prior art, the opposing torques would result in a net radial force passing, for example, normal to the paper plane of FIG. 2. This is the bearing stress which the present invention can greatly reduce and even eliminate.

This radial bearing stress decreases as the angular offset between the first meshing region (gears 19, 24) and the second meshing region (gears 24, 20) decreases. Consequently it is most advantageous, although not absolutely necessary, to make this angular offset zero.

In the illustrated embodiment, the angular displacement between the first and second meshing regions is made zero by making drive gear 19 coaxial to and of equal radius with driven gear 20. However, it is not absolutely necessary that this be the case. The radial bearing stress can also be reduced to zero even if gears 19, 20 are not coaxial and not of identical radius and toothing. It would be sufficient, for example, if gears 19, 20 were of different radius and non-coaxial but meshed with gear 24 at any given moment. Other modifications are possible within the general framework of the inventive concept. For instance, the angular offset between meshing regions could be quite small, for instance 3° or 4°, or even 10° or 20°, that is, not exactly zero. A great improvement will result providing only that the angular offset is very substantially less than 180°, the most disadvantageous angle.

In particular, it is strongly emphasized that while a single transducer gear 24 is provided, the provision of two identical but distinct coaxial gears 24, each meshing with a different one of gears 19, 20, would clearly be equivalent to the provision of a single gear 24. Moreover, such two coaxial gears 24 need not be even be of equal radius, providing that angular offset between the first meshing region (gear 19, one of gears 24) and the second meshing region (gear 20, other of gears 24) is substantially less than 180°, and most advantageously of all, 0°.

Without further analysis, the foregoing will so fully reveal the gist of the present invention that others can be applying current knowledge readily adapt it for various applications without omitting features that, from the standpoint of prior art, fairly constitute essential characteristics of the generic or specific aspects of this invention and, therefore such adaptations should and are intended to be comprehended within the meaning and range of equivalence of the following claims.

What is claimed as new and desired to be protected by Letters Patent is set forth in the appended claims:

1. A servomechanism, particularly a vehicle speedometer or trip-recorder, comprising, in combination, a controlled member; a servomotor; a drive gear driven by said servometer; a servoamplifier having an output connected to said servomotor and having a differential input; command means connected to said differential input for furnishing thereto signals indicative of a commanded position for said controlled member; feedback transducer means for furnishing to said differential input signals indicative of the position of said controlled member, said feedback transducer means having a rotating transducer input shaft which is to be protected from forces exerted upon said input shaft in direction radially relative to said rotating input shaft in order to prevent damage to said feedback transducer means, and further having a transducer input gear mounted on said rotating transducer input shaft for rotation therewith, said transducer input gear being driven by said drive gear and defining therewith a first meshing region having a predetermined orientation relative to the axis of saiid transducer input gear; and a driven gear driven by said transducer input gear and driving said controlled member, and defining with said transducer input gear a second meshing region having a predetermined orientation relative to the axis of said transducer input gear which is angularly offset from the orientation of said first meshing region by an angle of substantially less than 180°, whereby the combined forces exerted upon said transducer input gear by said drive gear and by said driven gear at said first and second meshing regions produce a resultant force which is predominantly circumferentially directed instead of being directed radially relative to said rotating transducer input shaft, to thereby prevent damage to said feedback transducer means such as could result from the exertion of excessive radially directed force upon said transducer input shaft.

2. A servomechanism as defined in claim 1, wherein said angle is approximately 0°, whereby the combined forces exerted upon said transducer input gear by said drive gear and said driven gear at said first and second meshing regions produce a resultant force which is substantially exclusively circumferential whereby to exert upon said rotating transducer input shaft substantially zero radially directed force.

3. A servomechanism as defined in claim 2, wherein said drive gear and said driven gear are coaxial.

4. A servomechanism as defined in claim 2, wherein said drive gear and said driven gear are coaxial, of equal radius and identically toothed.

5. A servomechanism as defined in claim 1, and further including biasing means for counteracting backlash in the transmission of force by said gears by permanently biasing said driven gear in one rotational direction, whereby when said drive gear and said transducer input gear drive said driven gear in the opposite rotational direction the opposing torques applied to said transducer input gear by said drive gear and by said biasing means via said driven gear will combine to form a resultant force which is predominantly circumferential and does not have a substantial radial component.

6. A servomechanism as defined in claim 3, wherein said angle is approximately 0°, whereby said resultant force will be substantially entirely circumferential and will have substantially no radial component.

7. A servomechanism as defined in claim 6, wherein said drive gear and said driven gear are coaxial.

8. A servomechanism as defined in claim 7, wherein said drive gear and said driven gear are coaxial, of equal radius and identically toothed.

9. A servomechanism as defined in claim 2, and further including a first intermediate gear non-rotatably connected to and coaxial with said transducer input gear and driven by said drive motor, and a second intermediate gear non-rotatably connected to and coaxial with said driven gear and driving said controlled member.

10. A servomechanism as defined in claim 6, and further including a first intermediate gear non-rotatably connected to and coaxial with said transducer input gear and driven by said drive motor, and a second intermediate gear non-rotatably connected to and coaxial with said driven gear and driving said controlled member.

* * * * *